United States Patent
Chainer et al.

(10) Patent No.: US 6,957,337 B1
(45) Date of Patent: Oct. 18, 2005

(54) METHOD AND APPARATUS FOR SECURE AUTHORIZATION AND IDENTIFICATION USING BIOMETRICS WITHOUT PRIVACY INVASION

(75) Inventors: Timothy Joseph Chainer, Mahopac, NY (US); Bruce P. Kitchens, Millwood, NY (US); Stephane Herman Maes, Danbury, CT (US); Marco Martens, Chappaqua, NY (US); Joseph Dela Rutledge, Mahopac, NY (US); Charles Philippe Tresser, Mamaroneck, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/372,170

(22) Filed: Aug. 11, 1999

(51) Int. Cl.⁷ .............................................. H04L 9/32
(52) U.S. Cl. ...................... 713/186; 713/182; 713/168
(58) Field of Search .................... 713/186, 182, 713/200, 201, 202, 168, 172; 382/115, 124

(56) References Cited

U.S. PATENT DOCUMENTS

| | | | |
|---|---|---|---|
| 5,623,552 A * | 4/1997 | Lane ........................... | 382/124 |
| 6,038,315 A * | 3/2000 | Strait et al. .................. | 713/183 |
| 6,219,439 B1 * | 4/2001 | Burger ........................ | 382/115 |
| 6,332,193 B1 * | 12/2001 | Glass et al. .................. | 713/170 |
| 6,762,684 B1 * | 7/2004 | Camhi ....................... | 340/573.1 |

* cited by examiner

*Primary Examiner*—Matthew Smithers
(74) *Attorney, Agent, or Firm*—Stephen C. Kaufman, Esq.; McGinn & Gibb, PLLC (57) ABSTRACT

A method and apparatus for authenticating (or identifying) a subject, includes using one or a plurality of biometric measurements for authentication (or identification) without any sharing of the subject's biometric data with a party requesting authentication.

50 Claims, 4 Drawing Sheets

METHOD AND APPARATUS FOR SECURE AUTHORIZATION AND IDENTIFICATION USING BIOMETRICS WITHOUT PRIVACY INVASION

BACKGROUND OF THE INVENTION

1. Field of the Invention

The present invention generally relates to a method and apparatus for authorization based on biometrics, and more particularly, to a method and apparatus for secure authorization using biometrics but without invasion of a subject's privacy. The invention is also equally applicable to other biometric functions such as identification.

2. Description of the Related Art

The need for personal recognition is a basic requirement of society which has existed for thousands of years. There are a number of activities in today's society which require identification including writing checks, making credit card purchases, authorizing a contract to purchase a home or car, obtaining pharmacological products, obtaining physical access to a building, submitting taxes, becoming married, etc.

Authentication techniques which an individual may use today can be divided generally into four major categories:

1) Something possessed—a physical object that a subject carries such as a key or a badge;
2) Something known—a password or personal identification number (PIN) or sequence which must be remembered, or answers to personal (or presumably familiar) questions or problems (e.g., birth date, mother's maiden name, etc.);
3) A physical characteristic—a fingerprint, hand geometry, retinal scan characteristics, dental records, facial characteristics, or voice features (vocal tract effect, pitch); and
4) Acquired characteristics–a manner of signing a document or of writing a text, accent, way of speaking (prosody, use of words etc.)

Some of the above methods require cooperation of the user (e.g., writing a text, answering a question, speaking, signing a document, undergoing a physical inspection such as for dental or retinal characteristics, etc.), while others can be more passively acquired. However, each method by itself has certain drawbacks.

For example, a key or badge is external to a person and can be lost, stolen or shared with other individuals, and therefore does not ensure that the person in possession of the key is the same person who is authorized to obtain access.

The use of passwords or PIN numbers has been accepted as one means of personal identification. However, passwords must be remembered and can also be shared. Thus, security can be breached. Further, passwords preferably should be long for enhanced security protection. However, lengthy passwords are hard to remember. Moreover, the average number of passwords people have to remember is growing annually. This is problematic.

Examples of the proliferation of passwords include E-mail, Phone Mail, Bank ATM card, Credit Card PINs, Calling Card PINs, Internet Access Password, Stock Account Password, Bank account password, car alarm password, etc.; each is prevalent in society. As a result, account holders must physically record (e.g., write down) each of their passwords and PINs which is a clear threat to security.

Moreover, the use of a single password for several applications is often impossible as each application may assign a password or have different rules for the methods of selection and also the frequency with which passwords must be changed.

Further, in some cases, password protection has been compromised by thieves and others directly observing or filming passwords as they are being input (e.g., keyed in). These practices are used frequently to obtain calling card passwords, and may include use of false ATM machines, or phone line tapping.

A biometric print (i.e., stored in some database and used to perform biometric recognition) of a subject (e.g., person, animal, object, etc.) is based on, in the case of a person, a unique physical characteristic such as a fingerprint, retinal pattern, DNA, hand geometry, dental characteristics, voice characteristics, and the like. It is unique (to a certain degree) and cannot be lost, stolen or shared with another person. Therefore, if used properly, it can provide a higher level of security, or at least can be used as a basis for a mechanism for ensuring a higher level of security. Depending on the measured biometric, cooperation of the person may or may not be required.

However, acquiring biometrics of a subject typically requires the subject to perform an action. The advantage of this approach is that it only works if the person chooses to cooperate.

Unfortunately, a major drawback of the use of biometrics is the loss of privacy that a person suffers when he/she provides a network or organization his/her biometric identity. Indeed, there have been many examples in society where personal information has been used by organizations with dramatic negative impact on society. Therefore, in a democratic society, the need to provide a security for one's personal identity is and will continue to be important.

Furthermore, a common practice for many commercial corporations is to sell to other companies customer data including marketing surveys, demographics, etc. As a result, many people are emphatic about not having their biometric characteristics known by such commercial companies nor any company (as any company can change policies or be purchased by another company with different moral and ethical standards).

Thus, prior to the invention, there has been no method or apparatus which can provide secure authorization using biometric information, while unobtrusively and non-invasively using biometric data in such a manner that the biometric data is not shared with another party (e.g., either a party requesting authorization or a third party).

SUMMARY OF THE INVETION

In view of the foregoing and other problems of the conventional methods and systems, an object of the present invention is to provide a method and structure in which secure authorization is provided by using biometric information unobtrusively and non-invasively in such a way that there is minimal (or no) privacy invasion and such that the biometric data cannot be shared with a third party.

In a first aspect of the present invention, a method of authenticating a subject includes using one of a plurality of biometric measurements of a subject for authentication without the subject sharing their biometric data with another party (e.g., either the authorizing party such as the party requesting authentication or any other party).

In a second aspect of the present invention, a method of authenticating a characteristic of a subject includes using at least one of a plurality of authentication methods including personal information of the subject, a biometric of the subject, a password, and a secured card; and simultaneously with the using of the at least one of the authenticating methods, the subject maintaining confidentiality of authentication material and withholding the material from any other party.

In a third aspect of the invention, a method for secure authentication of a subject includes selectively requesting any of passwords and knowledge-based information from the subject, and simultaneous with the selective request, interrogating a biometric of the subject, the biometric information being carried by the subject.

Thus, the present invention provides a system and method for using biometrics for verification without the invasion of privacy. The invention combines any of passwords, knowledge-based information and biometrics to provide secure and reliable authentication. Indeed, the invention, while using biometrics to generate a password, does so without an invasion of the subject's privacy.

Further, extremely reliable identification is provided by using the present invention. For example, a device could have several owners, producing a different password for each or the same one, depending on the application, provided that each owner's password is registered with the authorizing system and all biometric information is stored in the device, or more generally accessible by the device. The local user's identity can be determined locally by having the user providing his/her user ID or by biometric identification of the user among the enrolled authorized users. The identification stage can be implemented by producing, for example, a set of N best matches for N subsets. The index formed by concatenation of the N indices can uniquely identify the user. This enables not only authentication, but also prior identification of the user without transmission of the biometrics.

BRIEF DESCRIPTION OF THE DRAWINGS

The foregoing and other purposes, aspects and advantages will be better understood from the following detailed description of a preferred embodiment of the invention with reference to the drawings, in which.

DETAILED DESCRIPTION OF PREFERRED EMBODIMENTS OF THE INVENTION

Turning now to the drawings and more specifically to FIGS. 1–4, embodiments of the present invention will be described below. It is noted that, for consistency and ease of understanding, the same reference numerals are used to designate like elements throughout the drawings.

First, it is noted that the present invention, in the preferred embodiments, will use some standard methods from modern cryptography. A description of the specific cryptographic techniques used in this disclosure (SK/PK pairs and hash functions) can be found in "Handbook of Applied Cryptography", by Alfred J. Menezes, Paul C. van Oorschot and Scott A. Vanstone, CRC Press, 1997.

It is noted that, e.g., by using some zero-knowledge protocol, a Smart card can be authenticated but cannot be duplicated, and the authentication may have no access to some of the information stored in the Smart card, while this information can be used during the usage of the Smart card, to generate other information. This property is what the present inventors consider to be the characterization of a smart card, for purposes of the present application. Accordingly, in the present disclosure, any electronic component with these properties and with some memory and/or some processing capabilities, will be called "a smart component" or "a Smart card", even if it does not actually take any form resembling a "card". A general reference to Smart card technology and applications can be found in "Smart Cards: A Guide to Building And Managing Smart Card Applications" by Henry Dreifus and J. Thomas Monk, John Wiley & Sons, 1998.

Additionally, it may be described below that a card or some other device is uniquely recognized by some external reader. For such an operation, a variety of methods allowing such unique recognition are well known to people ordinarily skilled in the art of security protection, using either pure cryptography, tagging methods, or a combination thereof.

Figure 1:
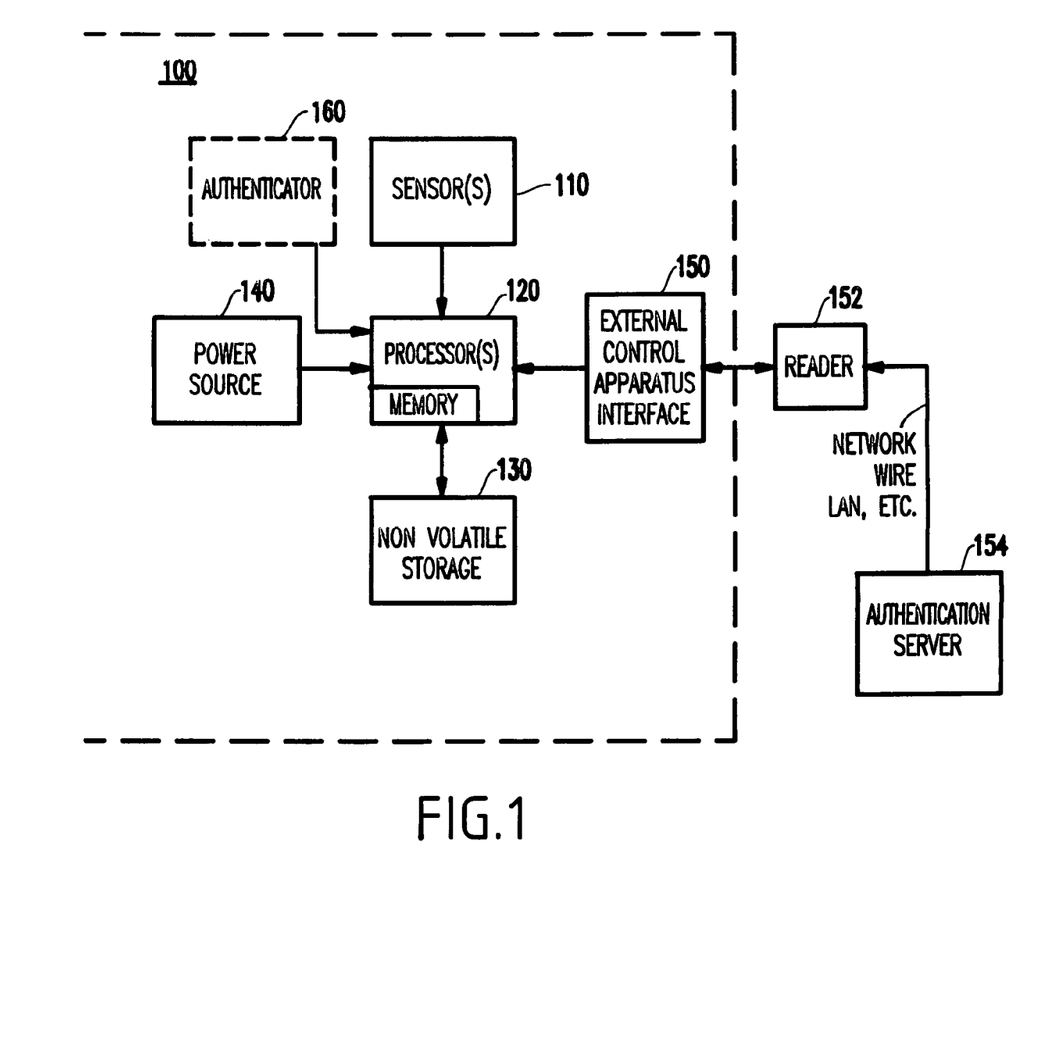
FIG. 1 displays the overall structure of a device 100 according to the present invention.

With reference now to FIG. 1, a device 100 is shown according to the present invention. It is noted that the device 100 optionally may be a portable unit or a non-portable unit depending upon the designer's constraints and requirements. Further, the device 100 may take the form of a Smart card, a personal area network (PAN) tool, an apparatus, such as a computer or a terminal, linked (e.g., either by wire or wireless communication) to a network.

According to the invention, the device 100 includes at least one sensor 110, and more preferably a plurality of sensors 110, each of which is sensitive to some form of biometrics (or a plurality thereof for multiple function sensors).

The device 100 further includes at least one processor 120 for analyzing biometric data so as to encode and authenticate them, building an encoded password out of biometric data, and generating further authentication.

For example, the sensor 110 can capture finger print(s) data in the form of the minutia coordinates, say each coordinate being defined with four digits. In 120, these numbers are then concatenated to form a master number N, and a secure hash function, another form of encryption, can then be used to produce the encoded password of the device itself in case enhanced security is desired. 120 also executes other typical tasks depending on the application.

For instance, "further authentication" of the device (e.g., card etc.) itself can be a second secret password attached to the device and "some other typical task" may include computing a password depending on the date and time and on the first and/or the second above mentioned secret passwords.

Additionally, device 100 includes at least one memory (or a general data storage device) 130, and a power source 140 and/or contact allowing use of an external power source (e.g., household AC circuit, DC power source, etc.).

Further included is a contact and/or a contact-less external control apparatus interface 150 (communication unit), allowing the device to communicate with an external control apparatus. The external control apparatus may be linked to a world wide network such as the World-Wide-Web or Internet, or to a local area network (LAN) through a reader 152. The reader 152 may be connected to an authentication server 154, as shown in FIG. 1.

For enhanced security, a non-duplicable authenticating tag 160 may be provided.

Depending on the application, one or several biometrics may be selectively employed. More particularly, for data such as fingerprints, in some cases vital signs would also be registered to assure that the authentication being performed is of a live human being. Such registration would not be as important in the case of signature strokes.

Additionally, for increased security and reliability, a plurality of biometrics might be used if the biometric is likely to be affected by external circumstances (e.g., the voice being affected by a cold, the strokes of a signature/writing sample being changed after a wrist injury, etc.).

Each of the chosen biometrics will be initialized as follows.

Figure 2:
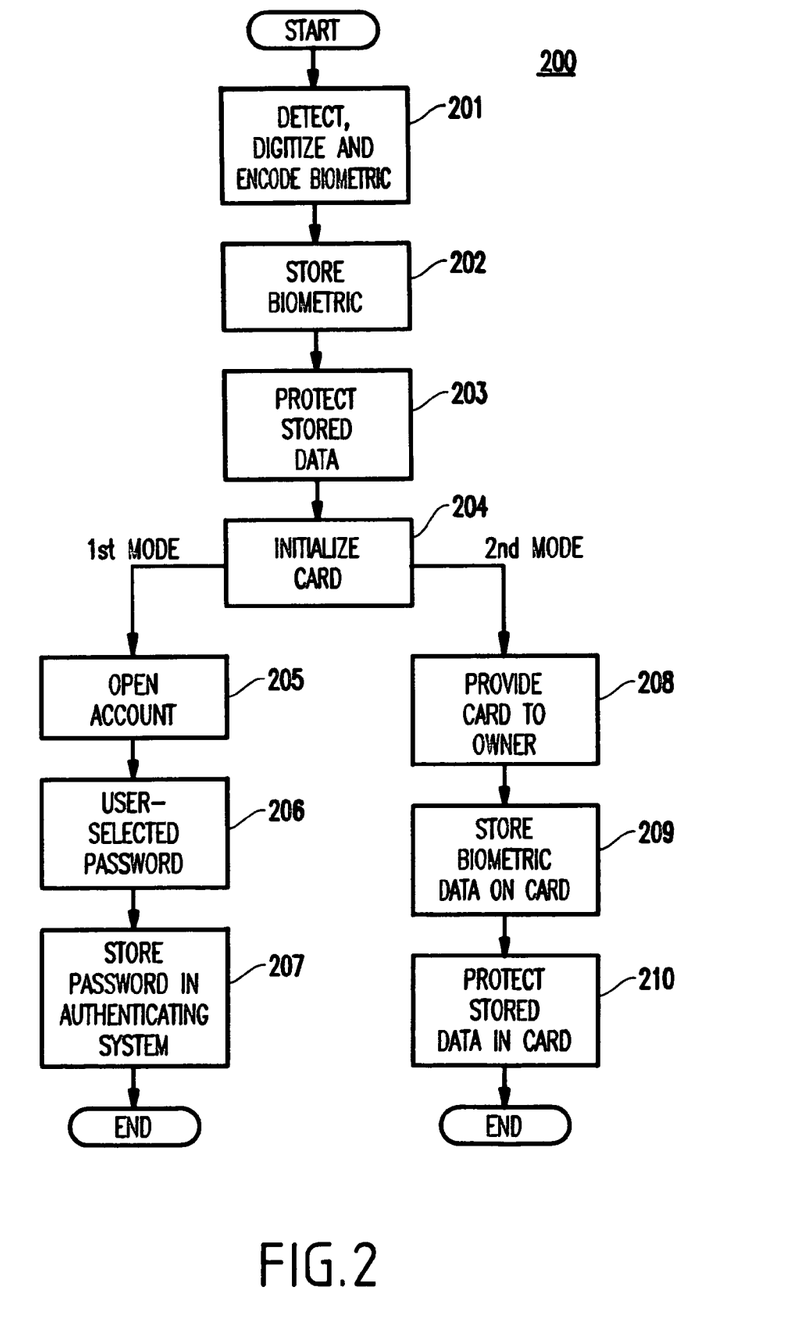
FIG. 2 is a flowchart illustrating how a device 100 according to the present invention is initialized and how a subject's biometrics are stored in a memory incorporated in the device 100 according to the present invention.

FIG. 2 shows a flowchart of a method 200 for initializing the biometrics to be used. In step 201, at a first use of the device 100, the biometric is detected by an appropriate sensor 110 (one of the sensors at 110 in FIG. 1), the data from the sensor are digitized, and, optionally, encrypted in the processing unit 120.

In step 202, the digital message so composed is stored in a data storage unit 130, corresponding to the appropriate one of sensors 110 (i.e., different sensors correspond to different addresses of data storage or different data storages).

After completion of this storage, in step 203, the stored data are protected so that attempting to reinitialize the process would invalidate the device. For example, the data could be protected by storing the data together with a secretly encrypted form of it. The authentication process will use the corresponding publicly known key. Another possibility is that the data could be written in a one-time write operation.

Thereafter, the device (card) is initialized. As shown in steps 204–210, there are two possible modes of initializing a device (e.g., a "Smart Card" or more generally a "Smart Device", etc.).

In a first mode (e.g., see steps 205–207), the owner opens an account "in person", perhaps by making an initial deposit, or by identifying him(her)self by some other means (e.g., a single-use PIN), as shown in step 205. A card (or more generally a device) is issued, and the owner uses it to produce a password depending on his (her) biometric, in step 206. The password is stored in the authenticating system, in step 207. Then, this is the password for that account, to be accepted thenceforth.

This system does not require any (but is compatible with) storage of biometric data in the device (card).

In a second mode (as in steps 208-210), the card (or more generally a device) is provided (e.g., by some secure means) to the owner with a password already installed which is known to the authenticating system (step 208). The owner initializes the card as described above, storing biometric data (step 209) by which, at each use, the card recognizes its owner and produces its pre-authorized password. Similarly, the card can protect the biometric data on the card (step 210) by destroying or nullifying the card if it is reinitialized.

However, the second mode has several drawbacks. For example, if the card is intercepted enroute to the proper owner, then it can be used freely by the intercepter. Secondly, once initialized, it contains the biometric data, though probably in encrypted form.

The first drawback can be an advantage from a privacy and convenience perspective. That is, the owner need not be otherwise identified to the authorizing system. The possession of the uninitialized card is sufficient.

With both the first and second modes for initialization, the actual generation of the password can be more involved, to avoid in particular counterfeiting on the basis of eavesdropping to get the password being transmitted.

For example, public key encryption can be used to generate an actual password on the basis of a "base" password (e.g., protected by the Smart card architecture for instance) and the present time. As public encryption is used, the eavesdropper cannot get back to the base password, while the addressee of the computed password, who is the generator of that public key encryption scheme, possesses that private part and can access the base password. The computed password cannot be reused as time changes.

To avoid even the improbable (because difficult) case of instant reuse, a transaction number can also be incorporated with the time and the base password to generate the transmitted password.

When the user receives the device 100, he (she) will perform a remote authentication with an authentication server 154 (shown in FIG. 1), to unlock the device (or to receive an authorization number that will unlock the device). Such concepts are described in the above-described U.S. patent application Ser. No. 08/873,079, filed on Jun. 11, 1997, having IBM Docket No. Y0997-136, entitled "PORTABLE ACOUSTIC INTERFACE FOR REMOTE ACCESS TO AUTOMATIC SPEECH/SPEAKER RECOGNITION SERVER", and in U.S. patent application Ser. No. 08/008,122, filed on Jan. 16, 1998, having IBM Docket No. Y0997-258, entitled "A PORTABLE INFORMATION AND TRANSACTION PROCESSING SYSTEM AND METHOD UTILIZING AUTHORIZATION AND DIGITAL CERTIFICATE SECURITY", each incorporated herein by reference.

Figure 3:
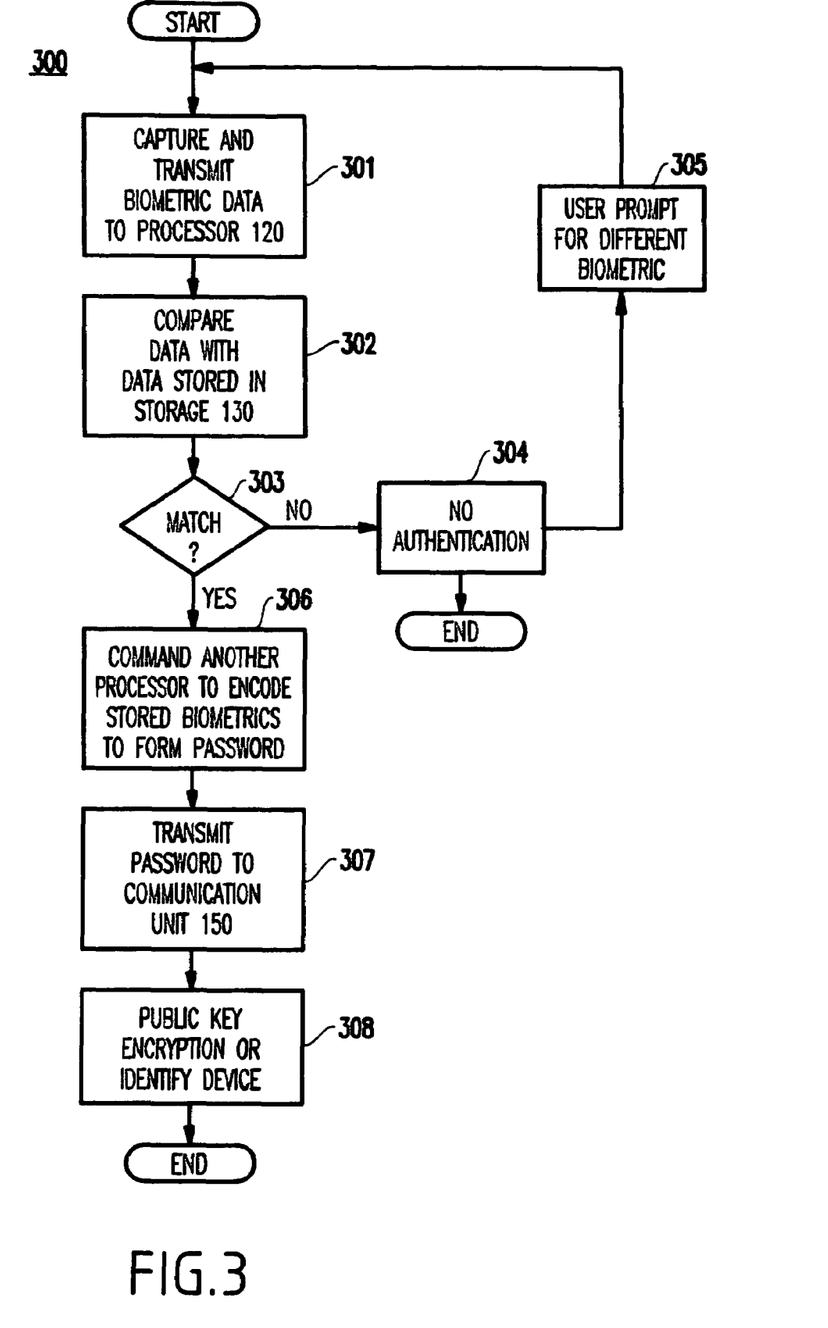
FIG. 3 illustrates a flowchart of the inventive method 300 of authentication.
Figure 4:
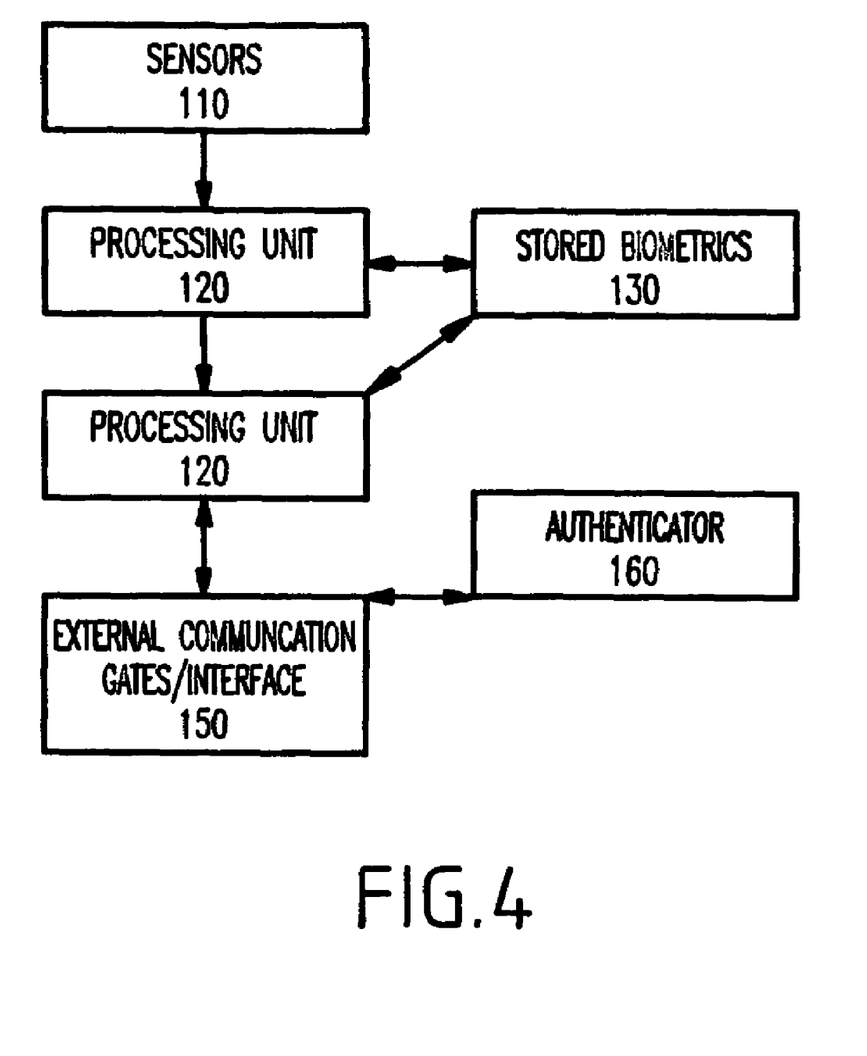
FIG. 4 is a block diagram of the inventive device 100 showing how authentication is performed according to the preferred embodiment of the present invention.

Referring to FIGS. 3 and 4, a method 300 and a system 400, respectively for performing the authentication procedure are shown and described hereinbelow. Such a method could be performed for one or more sorts (types) of biometric data that is being used in the transaction. For example, first fingerprints could be analyzed, then the method could be performed for voice, etc. The conjunction of such readings of different biometrics can also be used to ensure that the person is alive. It is noted that several sensors may be used which must work simultaneously, such as fingerprint and heart beat sensors.

In FIG. 3, in step 301, a sensor 110 (e.g., one of those at 110 in FIG. 1) captures the corresponding biometric and transmits it to a processing unit 120 (e.g., one of those at 120 in FIG. 1) which treats it in the same way as the processing unit at the time of initialization. The processor 120 stores the biometric in a register (or memory) for later comparison with what is stored in the data storing unit.

Then, in step 302, the ensuing digital stream is compared with what is stored in a data storing unit 130 (e.g., one of those at 130 in FIG. 1).

In step 303, if the processing unit 120 decides there is no match, then in step 304 no authentication occurs and the process ends. Alternatively, instead of ending the process, the process could continue to step 305 and the user could be prompted to use an alternate biometric when desirable by the application and loop to step 301.

If there is a match in step 303, then in step 306 the processing unit 120 commands another processing unit 120 (e.g., one of the processors 120 in FIG. 1; alternatively the same processor 120 which received the biometric data) to encode the stored biometric data to compose a password. It is noted that, since it is the stored data which is used each time, the password is the same at each usage. The same would be true for biometric data which can be read in an exactly reproducible manner.

Then, in step 307, this password is passed/transmitted to the communication unit 150 (e.g., one of the external control apparatus interface(s) 150 in FIG. 1). Optionally, in step 308, the public key encryption scheme to generate a transmitted password on the basis of a base password, as described above, can be used here.

Alternatively, in step 308, to complete the authentication in cases when more security is needed, the device itself can be identified. This prevents a problem such as a "false ATM", where the authentication message is captured and then reused without using the original device. This can be performed using zero knowledge protocol (e.g., see Cryptography: Theory and Practice, Douglas R. Stinson) or some other form of cryptography-based authentication, such as a coding algorithm which depends on the device and cannot be read from the device, or using some form of physical irreproducible authentication 160, as disclosed, for example, in U.S. Pat. No. 5,581,257 to Greene et al., incorporated herein by reference, in which radio frequency (RF) automatic identification systems have been proposed as a general purpose authentication system.

Such a system offers high security, and has been proposed for the protection of identification documents, credit cards, and money. The essence of this system is the existence of processes which generate one of a kind, non-duplicable, samples of some materials, so that the samples can be identified by some reading mechanisms. From this point of view, the use of inhomogeneous media in U.S. Pat. No. 5,790,025, incorporated herein by reference, is another instance of the same concept.

An important aspect of the invention is that biometric data verification is done by whoever needs to use an authentication. Then, this biometrics verification activates a password-controlled authentication mechanism which does not transfer enough information for the biometrics to be revealed. The entire system optionally can be carried, together with the recognition mechanism, on a tool that belongs to the person who wishes to use such a biometrics-based identification mechanism. (Of course, as mentioned above, the system could be non-portable and need not be carried by the user.)

For instance, in one preferred embodiment, a compact device (about the size of a credit card in the case of a Personal Area Network (PAN) tool as described in U.S. Pat. No. 5,790,827, incorporated herein by reference, or a Smart card), is provided which is able to read a specified biometric (e.g., fingerprints, voice, DNA-information, signature, etc. or a combination thereof), and produce the password needed, preferably using some encryption and/or secure hashing.

Preferably, this device is owned by the person to be authorized to do some task. The procedure of authorization will be implemented, for example, as described below.

First, at the moment of authorization the person puts the device (or inserts it partially, or slides it through a reader, or presents it to a reader for remote reading) into the machine which prompts for a password for some authorization to be given. The device will read the biometrics (or some number of them) using some sensor (or a plurality of them) included in the device and compute the password.

Then the device will let the password be read by the authorizing machine (e.g., in a contact or contact-free manner).

The method described above implies usage of a hashing/mapping method which is stable with respect to the variations of the biometrics extracted at recognition. One possible way to achieve some stability includes mapping regions of the biometric-print space, to key/password generating rules. These rules can also be simultaneously be modified by PIN, password or answers to personal questions. That is, the result of the biometric measurement can be mapped to a password or a key. Unfortunately, biometric prints may be noisy and unstable. Thus, the invention desires to define a set of regions stable enough so that mapping can be built between these regions and the resulting password.

Alternatively, the stability is achieved by storing on the device the biometric-prints of the user (e.g., or each of a plurality of users if the device has multiple users). Different conventional hardware and software security solutions can be used to protect access to the stored template. Smartcard architectures are good examples on how to achieve such secure storage.

It is also possible to encrypt the biometric-print using the user's biometric and personal knowledge (which can also be done in conjunction with the use of Smart card technology). This approach is described in U.S. patent application Ser. No. 09/240,214, filed on Jan. 29, 1999, having IBM Docket No. Y00998-334 and entitled "BIOMETRIC AUTHENTICATION SYSTEM WITH ENCRYPTED MODELS", incorporated herein by reference. Of course, the storage of a local biometric-print forbids remote authentications of the user. This is especially acute for telephone-based voice authentication. That is, the service provider would still need to store locally the users' voice print.

As a first solution to the above problem, an acoustic coupler could be used as described in U.S. patent application Ser. No. 08/873,079, filed on Jun. 11, 1997, having IBM Docket No. Y0997-136 and entitled "PORTABLE ACOUSTIC INTERFACE FOR REMOTE ACCESS TO AUTOMATIC SPEECH/SPEAKER RECOGNITION SERVER", incorporated herein by reference. However, the verification would be performed locally as disclosed in the present invention, and only a binary password or logon-procedures would be transmitted, instead of the acoustic features for a networked verification.

Another solution is proposed using compressed biometrics in U.S. patent application Ser. No. 08/126,894, filed on Jul. 31, 1998, having IBM Docket No. Y0997-252, entitled "SYSTEM AND METHODS F OR COMPRESSING BIOMETRIC MODELS", incorporated herein by reference. Instead of storing the biometric (encrypted or not, locally or on the network), a user's biometric-print is measured by ranking biometric prints of N subsets of M biometrics. The index of the top ranking speaker for each of the N subsets can be used as elements of the key generation or password generation procedure. Order of the bit contributions, indexes of the speakers in each subset, amount and composition of the subsets are all elements which can be uniquely associated to a service provider and can even be determined individually user by user or on the basis of other external information like password or personal information.

For further protection of privacy, the device can also compute a new password, by some function whose inverse is not effectively computable, out of key generation described above.

For enhanced security, the device also may carry a unique non-duplicable authentication mechanism, which may be constructed so as to be completely independent of the biometric. The password (or a plurality thereof) may for instance be an encrypted version of the biometric. Again, what is most important for the sake of privacy protection is that the authorizing machine will not have any access to the biometric itself.

The device cannot be used by anyone other than the owner, since the password is not stored in the device, at least not in an accessible way as described below, and the device will produce the correct password only when it can read the biometrics from the owner.

However, a device could have several owners, producing a different password for each or the same one, depending on the application, provided that each owner's password is registered with the authorizing system and all biometric information is stored in the device, or more generally accessible by the device. The local user's identity can be determined locally by having the user provide his/her user ID or by biometric identification of the user among the enrolled authorized users.

The identification stage can be implemented as described in the above-mentioned U.S. patent application Ser. No. 08/126,894, incorporated herein by reference. It produces a set of N best matches for the N subsets. The index formed by concatenation of the N indices can uniquely identify the user. This enables not only authentication, but also prior identification of the user without transmission of the biometrics.

Further, a smart card, PAN tool, etc. containing a reader for fingerprints could be usable together with vital signs readers.

Additionally, a smart card, PAN tool, etc. could be connected to a pen for recording the strokes of the signature of the person as he/she signs their name and could be used with signature verification. To verify a signature, a data input pen as described in U.S. Pat. No. 4,513,437 to Chainer et.al., incorporated herein by reference, could be used which contains two accelerometers which measure the acceleration along two perpendicular axes of the pen body and a derivative of force sensor which measures the rate of change of force of the pen to the paper.

The signals are sampled while signing, and can be input to the smart card for comparison with an encrypted reference of the person's signature dynamics. Storing encrypted biometric information on smart cards is described by Abraham et. al., IBM Systems Journal Vol. 30, No. 2, 1991. The data input pen produces signals while signing on any surface. Therefore, only a cable or radio frequency (RF)-type connection with the card would be necessary.

Alternatively, the device (e.g., smart card, etc.) could contain an x-y grid, and the signature dynamics would be recorded on a grid-crossing surface which provides x, y and time location of the pen tip to provide dynamic signature data to the card.

Such devices could be used for instance to gain access to machines such as ATM-machines, but neither the ATM-machine nor the bank will know the fingerprint.

Another example of use of this invention is a biometric-based single sign-on system. Indeed, once a password generation mechanism is designed which allows the use of robust hash/mapping of the test biometric-print, hash/mapping of a securely stored local biometric-print or hash/ mapping of a compressed biometric-print as described in the above-mentioned U.S. patent application Ser. No. 08/126, 894, incorporated herein by reference, all the ingredients are present to provide a biometric single sign-on service. For a given user, a Java®, HTPD and Windows® password request can be identified automatically, or if needed, hand-tagged by the user. Requests from unknown providers induce the generation of a new password along with its appropriate biometric-print-to-password map.

The map is encrypted and stored locally along with a user/logon-ID and the identification of the logon page or other signature of the authentication request from the service in question. The user always has the option to over write the logon-ID and password to suit his preferences or the requirements of the service provider. The correction is also stored as additional mapping. Upon receiving a request, the system checks if the requester is already assigned a password.

If a password already has been assigned, the system automatically and transparently logs the user-in, possibly after asking confirmation from the user, otherwise, it generates a new password as described before.

With a conventional single sign-on solution adding biometrics to the authentication procedure, the single sign-on manager can be run locally on the user's work station, instead of being distributed. Should distribution be needed, the private biometric approach can be used to maintain privacy.

Further, with the approach of the present invention, knowledge-based information and passwords can be treated like biometric-prints. In degenerate cases, the system might use only one of these security mechanisms.

In the case of multiple sign-on for instance, the sensor will not necessarily be included in the device, or an alternate sensor will be used which communicates with the device so that the device can be kept in a pocket.

For example, if a user works with a computer which serves as a terminal for many applications, the user can use a PAN tool and have some biometric data read each time a new application needs authentication, for example by simply using a sensor attached to the terminal. The reading is transmitted to the PAN tool where the verification is made and the appropriate password(s) is (or are) generated.

As still another use, the device can generate audible signals which can be transmitted over telephone lines to allow the user to identify himself/herself on the telephone without giving out his/her biometric data (e.g., the telephone used can be such that it distorts such identifying personal characteristics, but still allows the recognition of the signal generated by the device). This is an extension of the above-mentioned U.S. patent application Ser. No. 08/873,079.

Along with the above, the present invention may be utilized in combination with a method to perform text-independent speaker recognition, as described in U.S. patent application Ser. No. 07/788,471, filed on Jan. 28, 1997, and having IBM Docket No. Y0996-188, entitled "TEXT-INDEPENDENT SPEAKER RECOGNITION FOR TRANSPARENT COMMAND AND CONTROL AMBIGUITY RESOLUTION AND CONTINUOUS ACCESS CONTROL", a method to add knowledge-based information, as described in U.S. patent application Ser. No. 08/871,784, filed on Jun. 11, 1997 and having IBM Docket No. Y0997-138, entitled "APPARATUS AND METHODS FOR SPEAKER VERIFICATION/IDENTIFICATION/CLASSIFICATION EMPLOYING NON-ACOUSTIC AND/OR ACOUSTIC MODELS AND DATABASES", and a random question based access control system, as described in U.S. Pat. No. 5,774,525, entitled "METHOD AND APPARATUS UTILIZING DYNAMIC QUESTIONING TO PROVIDE SECURE ACCESS CONTROL", all incorporated herein by reference.

Thus, with the invention, a subject can be authenticated/ identified and yet the subject's privacy remains intact. That is, a device, which may or may not be portable depending on its configuration, can authenticate a subject by asking the subject a question, measuring a biometric, etc., to produce a password, and subsequently the password is provided to an entity requiring the authentication/identification.

While the invention has been described in terms of several preferred embodiments, those skilled in the art will recognize that the invention can be practiced with modification within the spirit and scope of the appended claims.

For example, in the invention, questions may be asked to the user (subject) for the local authentication. The answer may be based on the history of the previous authentication. Thus, it may be useful to store locally (e.g., at the subject's side) information about the last (previous) authentication. Further, it may be desirable to periodically update the biometric print to prevent an "aging" effect.

For example, the invention can be applied to a steering wheel to develop a "Smart steering wheel". In such a case, the user would grip the steering wheel, and the user's fingerprints would be read. If the fingerprints match an identification profile of the user, then the car is rendered operable (e.g., started, etc.).

The inventive concept could also be applied to firearms. For example, a "Smart pistol" could be implemented in which the user would grip the pistol grip, and the user's fingerprints would be read. If the fingerprints match an identification profile of the user, then the pistol would be rendered operable.

What is claimed is:

1. A method of authenticating a subject, comprising:
using one or a plurality of biometric measurements for authentication without any sharing of the subject's biometric data, by accomplishing said authentication without any of said one or plurality of biometric measurements being accessible in any form to any external device or external party, said biometric data being encrypted.

2. The method according to claim 1, further comprising:
storing said biometric data in an individual unit, said individual unit belonging to said subject.

3. The method according to claim 2, wherein said individual unit is portable for being carried by said subject.

4. The method according to claim 2, wherein said individual unit is non-portable.

5. The method according to claim 2, wherein said individual unit comprises one of a smart card, a personal area network (PAN) tool, and an apparatus linked to a network.

6. The method according to claim 1, further comprising:
after said authentication, selectively obtaining access to any of a location, a service, and an option in a service by said subject.

7. A method of authenticating a subject, comprising:
using one or a plurality of biometric measurements for authentication without any sharing of the subject's biometric data, by accomplishing said authentication without any of said one or plurality of biometric measurements being accessible in any form to any external device or external party; and
generating at least one of a password and another authentication procedure based on biometric authentication locally under the subject's control.

8. The method according to claim 7, further comprising:
securely storing the biometric on an apparatus carried by said subject.

9. The method according to claim 7, further comprising:
deriving said at least one of the password and the another authentication procedure from compressed biometrics extracted locally under the subject's control or from a network, when authentication is required.

10. The method according to claim 7, further comprising:
managing multiple passwords and authentication procedures, by at least one of:
monitoring an authentication request;
identifying a requester;
generating at least one of a new password and an authentication procedure for a new requester;
storing the authentication procedure generation method and the identity of the requester in a secure manner; and
authenticating the user for known requesters using the stored procedure and the result of the local authentication procedure.

11. A method of authenticating a subject, comprising:
using one or a plurality of biometric measurements for authentication without any sharing of the subject's biometric data, by accomplishing said authentication without any of said one or plurality of biometric measurements being accessible in any form to any external device or external party; and
generating at least one of a password and another authentication procedure based on at least one biometric feature extracted locally under the subject's control.

12. The method according to claim 11, wherein said generating is performed without storing the subject's biometric feature.

13. The method according to claim 11, further comprising:
deriving said at least one of the password and the another authentication procedure from the biometric extracted locally when authentication is required.

14. A method of authenticating a characteristic of a subject, without compromising privacy of the subject, said method comprising:
using at least one of a plurality of authentication methods including personal information of the subject, a biometric of the subject, a password, a personal identification number (PIN) and a secured component; and
simultaneously with said using, said subject maintaining confidentiality of authentication information by withholding access of said authentication information from any external device or external party,
wherein said withholding access further includes an encryption of data stored that represents said biometric.

15. The method according to claim 14, further comprising:
selectively completing the authentication with a remote service using a communication port and protocol.

16. A method of authenticating a characteristic of a subject, without compromising privacy of the subject, said method comprising:
using at least one of a plurality of authentication methods including personal information of the subject, a biometric of the subject, a password, a personal identification number (PIN) and a secured component;
simultaneously with said using, said subject maintaining confidentiality of authentication information by withholding access of said authentication information from any external device or external party; and
generating at least one of a password and another authentication procedure based on authentication locally under the subject's control.

17. The method according to claim 16, further comprising:
securely storing authentication information on an apparatus locally under the subject's control.

18. The method according to claim 17, further comprising:
  securely storing the authentication information on the apparatus using at least one of a knowledge-based information, a possession-based information, a password-based information, and a biometric-based information.

19. The method according to claim 16, further comprising:
  deriving said at least one of the password and the another authentication procedure from the local authentication when authentication is required.

20. A method for secure authentication of a subject, said method comprising:
  selectively requesting any of a password and a knowledge-based information from said subject; and
  simultaneously with said selectively requesting, interrogating biometric information of the subject, said biometric information being carried by said subject and being maintained inaccessible by any external device.

21. The method according to claim 20, further comprising:
  using said biometric information to generate said password.

22. The method according to claim 20, further comprising:
  performing biometric data verification by a device associated with said subject,
  wherein said biometric data verification activates a password-controlled authentication mechanism which transfers information, but which withholds sufficient information so that the biometric is not revealed, to a party requiring authentication.

23. The method according to claim 21, wherein obtaining said password is performed by using at least one of an encryption and secure hashing.

24. The method according to claim 20, wherein a device is carried by the subject to be authorized to perform a task,
  wherein at a moment of authorization, said device is presented to a reader of an authorizing machine of an entity seeking authentication, which prompts said device for a password for authorization to be given, and wherein said device reads a biometric of said subject using a sensor included in the device and computes the password.

25. The method according to claim 24, wherein said device allows the password to be read by the authorizing machine.

26. The method according to claim 25, wherein said password is read in a contacting manner.

27. The method according to claim 25, wherein said password is read in a contact-free manner.

28. The method according to claim 24, further comprising:
  using one of a hashing and a mapping technique, which is stable with respect to variations of the biometric extracted, said using including mapping regions of a biometric-print space, to the password having been computed.

29. The method according to claim 28, wherein said using includes:
  measuring a biometric-print of the subject by ranking biometric prints of N subsets of M biometrics,
  wherein an index of a top ranking of each of the N subsets is used in computing the password.

30. The method according to claim 24, further comprising:
  storing on the device information regarding a previous authentication including a biometric-print of the subject.

31. The method according to claim 20, further comprising:
  encrypting a biometric-print using the subject's biometric and personal knowledge onto a device carried by said subject.

32. The method according to claim 20, further comprising:
  providing a unique non-duplicable authentication mechanism on a device associated with said subject, said authentication mechanism being constructed so as to be completely independent of the biometric,
  wherein said authentication mechanism is prevented from accessing the biometric itself.

33. The method according to claim 32, wherein said device associated with said subject produces a correct password only when the device reads a biometric from the subject.

34. The method according to claim 20, wherein biometric information for a plurality of subjects is stored in a device associated with the subject.

35. The method of claim 20, wherein said being maintained inaccessible includes an encryption of said biometric information before being stored to be carried by said subject.

36. An apparatus for secure authentication, without compromising privacy of a subject, said apparatus comprising:
  a reader, associated with the subject, for reading a specified biometric of said subject; and
  a password generator for producing a password needed, based on said biometric,
  wherein said biometric is maintained as being inaccessible to any external device.

37. The apparatus according to claim 36, wherein said password generator includes an encryption device using at least one of encryption and secure hashing.

38. An apparatus for secure authentication, said apparatus comprising:
  means, associated with a subject, for reading a specified biometric of said subject; and
  means for producing a password needed based on said biometric, without providing access to said biometric by any external device or by anyone other than said subject.

39. The apparatus according to claim 38, wherein said means for producing said password includes an encryption device using at least one of encryption and secure hashing.

40. A method of identifying a subject, said method comprising:
  using one or a plurality of biometric measurements for identification without any sharing of the subject's biometric data by maintaining said biometric data as inaccessible to any external device,
  wherein said maintaining as inaccessible includes an encryption of said one or said plurality of biometric measurements before being stored as said biometric data.

41. A method of identifying a subject, said method comprising:
  using one or a plurality of biometric measurements for identification without any sharing of the subject's biometric data by maintaining said biometric data as inaccessible to any external device, wherein a the subject's identity is determined locally, under the subject's control, by having the subject provide at least one of a user ID and by biometric identification of the subject among enrolled authorized subjects, and wherein said identification produces a set of N best matches for N subsets, and an index formed by concatenation of the N indices uniquely identifies the subject.

42. A method for identification of a subject, said method comprising:

selectively requesting any of a password and a knowledge-based information from said subject; and simultaneously with said selectively requesting, interrogating biometric information of the subject, said biometric information being carried by said subject and being maintained as inaccessible by any external device.

43. The method of claim 42, wherein a subject's identity is determined locally under the subject's control, by having the subject provide at least one of a user ID and by biometric identification of the subject among enrolled authorized subjects, and wherein said identification produces a set of N best matches for N subsets, and an index formed by concatenation of the N indices uniquely identifies the subject.

44. An apparatus for identification of a subject, said apparatus comprising:

a reader, associated with the subject, for reading a specified biometric of said subject; and a password generator for producing a password needed, based on said biometric, wherein said biometric is maintained inaccessible by any external device.

45. The apparatus according to claim 44, further comprising:

means for storing data of said biometric in an individual unit, said individual unit belonging to said subject.

46. The apparatus according to claim 45, wherein said individual unit is portable for being carried by said subject.

47. The apparatus according to claim 45, wherein said individual unit is non-portable.

48. The apparatus according to claim 45, wherein said individual unit comprises one of a smart card, a personal area network (PAN) tool, and an apparatus linked to a network.

49. The apparatus according to claim 45, wherein a subject's identity is determined locally, under the subject's control, by having the subject provide at least one of a user ID and by biometric identification of the subject among enrolled authorized subjects being read by said reader, and wherein said identification produces a set of N best matches for N subsets, and an index formed by concatenation of the N indices uniquely identifies the subject.

50. An apparatus comprising:

at least two sensors to obtain at least two forms of biometric data, each said biometric data form respectively providing an identification metric that uniquely identifies an individual;

a non volatile memory to store biometric data from said at least two sensors during an initiation stage; and a comparator to compare said biometric data stored in said non volatile memory with a biometric data obtained by said at least two sensors during an authentication stage, wherein said at least two sensors, said non volatile memory, and said comparator are all located on a same device.

* * * * *